Figure 1:
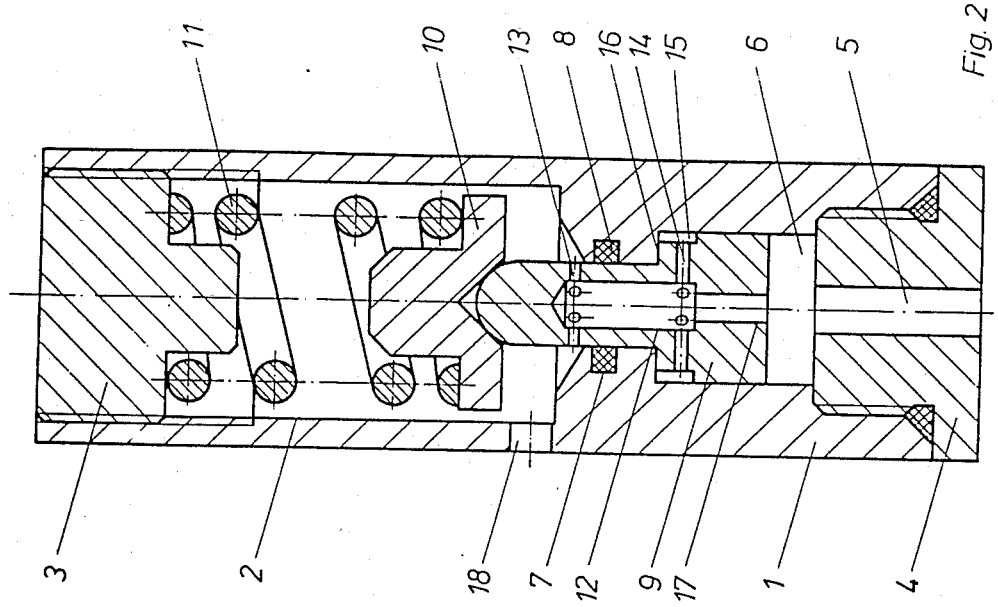

United States Patent [19]

Krieger et al.

[11] Patent Number: 4,552,172
[45] Date of Patent: Nov. 12, 1985

[54] PRESSURE-LIMITING HYDRAULIC VALVE

[75] Inventors: Karl Krieger, Wuppertal; Werner Reinelt, Bochum, both of Fed. Rep. of Germany

[73] Assignee: Hermann Hemscheidt Maschinenfabrik GmbH & Co., Wuppertal, Fed. Rep. of Germany

[21] Appl. No.: 558,457

[22] Filed: Dec. 6, 1983

[30] Foreign Application Priority Data

Dec. 9, 1982 [DE] Fed. Rep. of Germany ....... 3245667

[51] Int. Cl.[4] .............................................. F16K 17/34
[52] U.S. Cl. .................................. 137/484.6; 137/494; 137/538; 251/24
[58] Field of Search ...................... 137/484.2, 494, 538; 251/24

[56] References Cited

U.S. PATENT DOCUMENTS

| 2,886,058 | 5/1959 | Horton | 137/484.2 |
| 2,890,714 | 6/1959 | Greenwood | 137/484.2 |
| 3,482,594 | 12/1969 | Simon | 137/538 |
| 3,548,867 | 12/1970 | Grisebach | 137/494 |

*Primary Examiner*—Harold W. Weakley
*Attorney, Agent, or Firm*—Berman, Aisenberg & Platt

[57] ABSTRACT

A pressure-limiting valve for hydraulic fluids comprises a stepped switching piston which is loaded by a closing spring to oppose high fluid pressure obtaining in an inflow duct of the valve. Radial transverse bores branch from an axially-extending bore in the switching piston. When the setting pressure established by the closing spring is exceeded, the transverse bores in the piston move past an O-ring seal as the piston compresses the spring, and pressure fluid thus flows from the axially-extending bore into a discharge duct of the valve. The stepped switching piston is guided in a pressure chamber by a portion of its cross-section which is greater than that in the zone of the O-ring seal. Adjacent the inflow duct, the axially-extending bore in the piston has a reduced flow cross-section. Further radial bores lead from the axially-extending bore in the piston in the region of the stepped portion of the latter.

1 Claim, 2 Drawing Figures

PRESSURE-LIMITING HYDRAULIC VALVE

This invention concerns a pressure-limiting valve for hydraulic fluids, the valve having a stepped piston loaded by a spring and provided with bores which release excess hydraulic fluid to reduce the pressure of the latter.

Pressure-limiting valves of the type in which a piston co-operates with an O-ring seal have been known in various forms for a long time, the O-ring generally providing a good seal even in the case of hydraulic fluids under high pressure. One such valve, on which the present invention is based, is disclosed in French Pat. No. 1,149,979. In one form of construction described therein, the valve comprises a uniformly cylindrical switching piston which comprises, at the inflow side and below the O-ring seal, two mutually and oppositely disposed rows of radial bores arranged in a star-like formation. The setting pressure of the valve is determined by a closing spring which urges the switching piston into the closing position against the action of the pressure fluid.

When the pressure at the inflow side of this valve rises to only a slight extent above the setting pressure, the switching piston is also displaced, but only slightly, in the opening direction without the pressure fluid flowing away through the radial transverse bores. In other words, the rise in pressure is offset by the increase in volume which is achieved by movement of the piston. As the pressure rises, the switching piston is further displaced in the opening direction against the force of the closing spring so that a first row of transverse bores in the piston moves past the O-ring seal. The pressure fluid now flows from an axially-extending bore in the switching piston into an outflow duct of the valve. If the pressure of the fluid—and therefore the quantity of fluid to be discharged—then also increases, the switching piston is further displaced in the opening direction until a second row of radial bores in the piston also moves past the O-ring seal and communicates with the outflow duct. Because of its two rows of radial bores, this pressure-limiting valve has two "response stages" which come into action one after the other.

The response of a pressure-limiting valve is determined in a decisive manner by the characteristic of the closing spring which influences the pressure along the path of travel of the switching piston between the closed and opening positions. The pressure-limiting valve of the present invention is intended to be so rated that, during transfer flow and when the throughflow stream increases from, say, 0.04 to 30 liters/min., the pressure does not rise more than 20% above the setting pressure. This means that the closing pressure should be close to the opening pressure. The pressure-limiting valve can then help in maintaining a substantially constant pressure in the connected system at a level approximately to the setting pressure.

An opening pressure which to close to the closing pressure can, in theory, be obtained by using a "soft" spring which provides only a slight increase in pressure over a long stroke. However, a pressure-limiting valve comprising a soft spring operates extremely inefficiently as regards closing, since the switching piston returns to the closing position only after a relatively large drop in pressure. The behaviour of the valve is therefore best met by a very hard spring. However, the switching piston, when loaded by such a spring, is opened only when a marked rise in pressure occurs.

The aim of the present invention is to provide a pressure-limiting valve of small dimensions whereby the pressure in the connected system can be kept substantially constant when either large quantities or small quantities of fluid flow through the valve.

This object is achieved, in accordance with the invention, by using a pressure-limiting hydraulic valve which comprises:

(a) a valve housing having a bore therein;
(b) a switching piston arranged for axial displacement in said bore;
(c) an inflow duct leading to said bore whereby said piston is acted upon by pressurised fluid supplied through said inflow duct;
(d) a hard piston-closing spring arranged to act on said piston to oppose the pressure of the inflowing pressurised fluid, said spring thereby determining the setting pressure of the valve;
(e) an O-ring seal located in a circumferential annular groove in the inner wall of the housing bore so as seal off said piston in its closed position;
(f) an axial bore in said piston from the innermost zone of which extend radially and outwardly directed first transverse bores in a star-like formation to the outer surface of the piston whereby displacement of the piston, when the setting pressure is exceeded, into the opening position thereof causes said radial transverse bores to moves beyond the O-ring seal and to communicate with a discharge duct;
(g) second radial bores, spaced from the first radial transverse bores, in the switching piston; and
(h) a stepped configuration on the outer surface of the switching piston whereby, on the inflow side, the piston has a greater cross-section than in the zone of the O-ring seal, the second radial bores being adjacent the stepped portion of the switching piston and being arranged to discharge fluid into a pressure chamber forming part of the housing bore wherein the larger-diameter portion of the switching piston is tightly guided.

Figure 2:
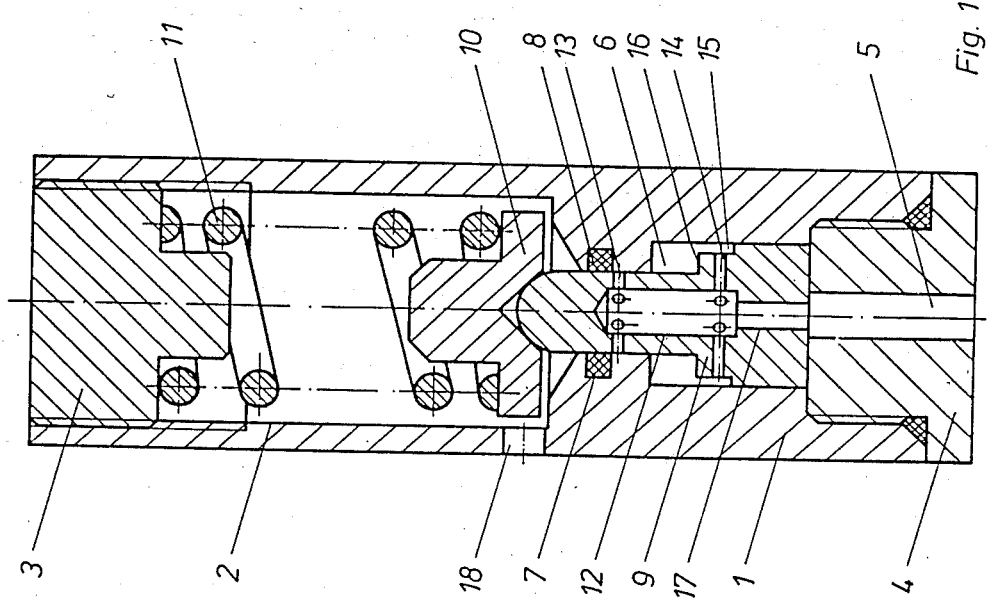

An example of a pressure-limiting valve in accordance with the invention will now be described with reference to the accompanying drawing, in which:

FIG. 1 shows the pressure-limiting valve in longitudinal section with the piston thereof in its closed position; and FIG. 2 shows the same valve but with its piston in the opened position.

The illustrated pressure-limiting valve has a housing 1 of cylindrical shape, the housing having a stepped longitudinally-extending bore 2 which is shaped to match the contours of the components described below. At one end of the valve bore 2 the housing 1 is sealed off by a closure plug or piece 3 and, at the other end, by a connector 4 provided with an inflow duct 5 through which pressure fluid is introduced into the pressure-limiting valve. The inflow duct 5 discharges fluid into a pressure chamber 6 forming a part of the valve bore 2. Adjoining the pressure chamber 6 is the narrowest portion of the valve bore 2, in the surface of which portion there is formed a circumferential annular groove 7 in which is fitted an O-ring seal 8. A switching piston 9 of circular cross-section which is stepped in the longitudinal direction is axially displaceable in the bore 2 and is guided by its surface of greater cross-section in the pressure chamber 6 and by its surface of smaller cross-section in that portion of the valve bore 2 in which the O-ring seal 8 is located. At its end remote from the pressure chamber 6, the switching piston 9 is loaded in the closing direction by a short, hard, helical closing spring 11 abutting against the closure piece 3, the load being applied by way of a spring buffer 10.

Formed in the switching piston 9 is a blind-end axially-extending bore 12 from the innermost zone of which extend radially outwardly directed transverse bores 13. In the closing position of the valve (see FIG. 1) the transverse bores 13 are located below the O-ring seal 8. Below the radial transverse bores 13 the piston has further radial bores 14 which extend outwards in a star-like arrangement and discharge into an annular groove 15 in the region of the stepped portion 16 which is formed between the portion of the switching piston 9 of greater cross-section and its portion of reduced cross-section. At its inflow end communicating with the pressure chamber 6, the axially-extending bore 12 comprises a portion 17 of reduced flow cross-section. The cross-section of the radial transverse bores 13 distributed over the periphery of the switching piston 9 are the same size, taken together, as the cross-section of the axially-extending bore 12 in the zone of unreduced cross-section.

The pressure limiting valve shown in the drawing has its piston located in the closing position illustrated in FIG. 1 as long as the force applied to the switching piston 9 by the pressure fluid on the inflow side is less than the oppositely-directed force exerted by the closing spring 11 which establishes the setting pressure of the valve. If a pressure exceeding the setting pressure occurs, then the piston moves upwards to compress the closing spring 11 as illustrated in FIG. 2. The radial transverse bores 13 thus move past the O-ring seal 8, with the result that pressure fluid flows from the inflow duct 5, through the pressure chamber 6, into the axially-extending bore 12 of the switching piston 9, and then through the radial bores 13 into a discharge duct 18 leading to the exterior. When the valve is opened, the annular space above the annular groove 15 is reduced until the switching piston 9, in the opening position, bears by way of the stepped portion 16 against a complementary projection extending from the valve bore 2.

It is to be observed that, unlike the valve shown in French Pat. No. 1,149,979 referred to above, the pressure-limiting valve shown in the drawing makes use of a short, hard, closing spring 11 exerting relatively great force and accommodated in a small space. The pressure fluid, on entering the pressure-limiting valve through the inlet duct 5, strikes the large lower face of the stepped switching piston 9 in the high-pressure zone, the piston being sealed off at the smaller cross-sectional face by the O-ring 8. As the pressure of the fluid gradually increases, the switching piston 9 is displaced upwardly and, after the setting pressure has been exceeded, the piston moves into the opening position in which the pressure fluid is able to flow away into the discharge duct 18 by way of the radial transverse bores 13. During displacement of the piston, pressure equal to that at the upper cylindrical surface of the piston is established by way of the radial bores 14 which discharge fluid into the annular groove 15 at the stepped portion of the switching piston.

If the fluid throughflow velocity increases greatly with the throughflow quantity, then, because of the form of the pressure-limiting valve shown in the drawing, hydrodynamic forces are set up which oppose the closing force of the closing spring 11 and which therefore reinforce the opening movement. The stream of fluid passing through the inlet duct 5 first enters a pressure chamber 6 of increased cross-section with respect to the inlet duct and then—as in the case of a Venturi tube—is directed through a portion of the axially-extending bore 2 of the switching piston 9 which is of reduced flow cross-section. The velocity of flow further increases in this throttle portion, whereas the fluid pressure diminishes. The pressure fluid then flows into the portion of the bore 2 which is of increased cross-section, the latter being equal to the sum of the outlet cross-sections of the radial transverse bores. During this phase, the kinetic energy of the pressure fluid first applied to the switching piston 9 a force acting in the opening direction. During flow of the fluid through the throttle portion and through the abruptly increased cross-section at the end of this zone, losses in pressure occur. The fluid pressure in the widened inner portion 12 of the axially-extending bore 2 is then—as in the annular space 15 which is connected thereto by the radial bores 14 and is located at the shouldered portion of the switching piston—lower than the pressure in the inflow duct 5 where the fluid acts on the large underface of the piston 9. The pressure differential produces, on the large face of the piston, an additional force which displaces the switching piston since it overcomes the force of the closing spring 11. By means of the stepped portion, the piston then bears against a projection in the bore of the valve. In the opening position, a large quantity of fluid is able to flow away through the outlet duct 18 without any increase in pressure.

During the closing phase, the switching piston 9 moves with its large face opposing the pressure which is set up. The annular space above the annular groove 15 at the stepped portion is again filled with pressure fluid which, however, because the switching piston is tightly guided in the pressure chamber, cannot flow back through a gap at the cylindrical face of the piston but only through its axially-extending bore 2 and the radial bores in opposition to the closing movement which is thus slowed down. In this way, the switching piston is prevented from oscillating during pressure surges with the radial transverse bores in the zone of the O-ring seal 8. Thus, the switching piston 9, the movements of which are damped down, ensures that the pressure-limiting valve responds in a precise manner.

We claim:

1. A pressure-limiting valve for hydraulic fluids subjected to high pressure, which valve comprises
   (a) a valve housing having a stepped bore therein providing a first bore portion of smaller diameter leading directly into a second bore portion of larger diameter with an annular step between the two portions;
   (b) a stepped switching piston arranged for axial displacement in said bore between a valve-open position and a valve-closed position, said piston having a first portion of smaller diameter for movement in said smaller-diameter bore portion and a second portion of larger diameter, divided by an annular step from said first piston portion, for movement in said larger-diameter bore portion;
   (c) an inflow duct leading to said larger-diameter bore portion whereby an end of said larger-diameter portion of said piston is acted on by pressurised fluid supplied through said inflow duct;

(d) a hard piston-closing spring arranged to act on a closed end of the smaller-diameter portion of said piston at all times to oppose the pressure of the pressurised fluid on said end of the larger-diameter portion of said piston, said spring thereby determining the setting pressure of the valve and being arranged to yield only when said piston is displaced;

(e) an O-ring seal located in a circumferential annular groove in the inner wall of the smaller-diameter portion of said housing bore so as to seal off the smaller-diameter portion of said piston in the valve-closed position thereof;

(f) a blind-end axial bore formed in said piston and having an inlet end and an outlet end, said outlet end having a larger cross-sectional area than said inlet end, first transverse bores extending from said outlet end in a star-like formation to the outer surface of the smaller-diameter portion of the piston below the O-ring seal whereby displacement of the piston, when the setting pressure is exceeded, into the valve-open position thereof causes said first transverse bores to moves beyond the O-ring seal and to communicate with a fluid discharge duct, the combined cross-sectional areas of said first transverse bores being at least equal to the cross-sectional area of said outlet end; and (g) second radially-extending transverse bores spaced axially from the first transverse bores and opening into an annular groove formed circumferentially in the larger-diameter portion of the piston adjacent the step thereof, the second radial bores being arranged to discharge fluid from said axial bore in said piston into a pressure chamber forming part of the housing bore and defined by the larger-diameter portion of the housing bore and the larger-diameter piston portion guided tightly therein, the cross-sectional area of the inflow duct being less than that of the larger-diameter portion of the housing bore and greater than that of the outlet end of said axial bore.

* * * * *